United States Patent

Hoshino et al.

[11] Patent Number: 5,813,167
[45] Date of Patent: Sep. 29, 1998

[54] GRAFTING METHOD AND DEVICE THEREFOR

[75] Inventors: Seiji Hoshino, Kanagawa; Takeo Tsujimoto, Shiga; Takamitsu Ohtani, Kyoto, all of Japan

[73] Assignees: Takii Shubyo Kabushiki Kaisha, Kyoto; T.S. Plant Science Institute Co., Ltd.; Dai-Ichi Ceramo Ltd., both of Shiga, all of Japan

[21] Appl. No.: 408,680

[22] Filed: Mar. 22, 1995

[30] Foreign Application Priority Data

Mar. 24, 1994 [JP] Japan .................................. 6-053799

[51] Int. Cl.⁶ ........................................................ A01G 1/00
[52] U.S. Cl. ......................................................... 47/6
[58] Field of Search ........................................ 47/6, 7, 1.01

[56] References Cited

U.S. PATENT DOCUMENTS

| | | |
|---|---|---|
| 3,500,582 | 3/1970 | Hyde . |
| 3,969,843 | 7/1976 | Wahler et al. .................................. 47/6 |
| 4,839,986 | 6/1989 | Grantham ....................................... 47/6 |
| 5,414,958 | 5/1995 | Honami et al. ................................ 47/6 |

FOREIGN PATENT DOCUMENTS

| | | |
|---|---|---|
| 599560 | 7/1990 | Australia . |
| 2578148 | 9/1986 | France . |
| 6007035 | 1/1994 | Japan ........................................... 47/6 |
| 6197632 | 7/1994 | Japan ........................................... 47/6 |
| 0730326 | 4/1980 | U.S.S.R. ...................................... 47/6 |
| 1184477 | 10/1985 | U.S.S.R. ...................................... 47/6 |

*Primary Examiner*—Michael J. Carone
*Assistant Examiner*—Joanne C. Downs
*Attorney, Agent, or Firm*—Jordan and Hamburg

[57] ABSTRACT

Grafting a scion on a stock is effected by opening a chuck and inserting bar-like members in a storage chamber successively into the chuck with the front end of such bar-like members protruding out of a front end hole 5D, 105D, closing the chuck 4, 104 to thereby hold the bar-like member 2, inserting the front end of the protruding bar-like member 2 into a graft joint end of the stock, separating the grafting device from the bar-like member, and inserting the other end of the bar-like member into a graft joint end of the scion so as to abut the graft joint ends of the stock and scion against each other. The bar-like member can be simply and rapidly inserted into the stock, so that abutment between the stock and scion can be effected with extreme ease.

24 Claims, 8 Drawing Sheets

GRAFTING METHOD AND DEVICE THEREFOR

BACKGROUND OF THE INVENTION

The present invention relates to a grafting method and a device therefor, wherein concerning fruits and vegetables including tomatoes, eggplants, and melons, a stock and a scion are abutted against each other at their graft joint ends so as to graft the scion on the stock.

In recent years, as a method for simple and reliable grafting, there has been developed a grafting method wherein a bar-like member is inserted into the joint portions of a stock and a scion. However, in this conventional method, first, a bar-like member held by hand is inserted approximately half the length thereof into the stem of a stock at its joint end. Thereafter, holding the joint end of the stock by hand to fix the bar-like member in position, the operator thrusts the bar-like member into the stem of a scion at its joint end, thus abutting the joint ends of the stock and scion against each other for grafting.

Therefore, the need hold a very thin bar-like member by hand and thrusting the hand-held bar-like member into the joint end of the stock has complicated the operation.

SUMMARY OF THE INVENTION

The present invention is intended to provide a grafting method and a device therefor, which solve the above problems.

A grafting method according to the invention comprises the steps of opening a chuck 4, 104 in a grafting device to allow bar-like members 2 in the storage chamber of the grafting device to move one after another into the chuck 4, 104, allowing the bar-like member 2 to suitably protrude out of the front end hole 5D, 105D, 205D of the grafting device, closing the chuck 4, 104 to hold the bar-like member 2, thrusting the bar-like member 2 protruding out of the front end hole 5D, 105D, 205D of the grafting device into the stem of a stock 11 at its graft joint end 11A, releasing the bar-like member 2 from the grafting device with the bar-like member 2 still attached to the stock 11, thrusting this bar-like member 2 into the graft joint and 12A of a scion 12, and abutting the graft joint ends 11A and 12A of the stock 11 and scion 12 against each other for grafting.

A grafting device of this invention will now be described.

A grafting device of this invention comprises a chuck 4, 104 for holding a bar-like member 2, a cylindrical clamp 5, 105, 205 which has a hole 5D, 105D, 205D for the bar-like member 2 to pass therethrough and in which the chuck 4, 104 is axially movable relative thereto and urged at its rear end, a cylindrical pressing member 1, 101 fitted on or in the clamp 5, 105, 205 and axially movable relative to the clamp 5, 105, 205, and means for opening and closing the chuck 4, 104 in response to the advance and retraction of the clamp 5, 105, 205 (claim 2).

This grafting device operates as follows.

When the operator advances the pressing member 1, 101 relative to the clamp 5, 105, 205, the chuck 4, 104 is pressed by the pressing member 1, 101 to advance relative to the clamp 5, 105, 205, with the result that the chuck 4, 104 is opened. Thereby, the bar-like member 2 passes through the chuck 4, 104 until its front end protrudes out of the device through the hole 5D, 105D, 205D. Since the chuck 4, 104 is urged rearwardly into to the clamp 5, 105, 205, when the operator retracts the pressing member 1, 101 from that state, the chuck 4, 104 is also retracted, with the result that the chuck 4, 104 closes. Thereby, the chuck 4, 104 holds the bar-like member 2 to prevent at least its retraction. In this state, the operator presses the front end of the bar-like member 2 against the joint end of a stock, whereby the bar-like member 2 is thrusted into the stem of the stock without being forced into the chuck. When the device is taken away from the stock, the rear end of the bar-like member 2 remains protruding out of the joint end of the stock. In this state, holding the joint portion of the stock by hand, the operator thrusts the rear end of the bar-like member 2 into the joint end of the scion, thus abutting the joint ends of the stock and scion against each other to complete the grafting operation.

The grafting method and device therefor are adapted to thrust a bar-like member into the stem of a stock at its joint end with extreme ease and rapidity and have an effect that the operation of grafting a scion on a stock can be performed with extreme ease.

It is preferable that the pressing member 1, 101 is biased rearwardly of the clamp 5, 105, 205. With this arrangement, when the pressing member 1, 101 is not pressed, that is, when the present device is not used, the pressing member 1, 101 and the clamp 5, 105 do not move relative to each other, which means that there is no play between the two and the device as a whole is convenient to operate.

So long as the chuck 4 can grip and release the bar-like member 2, the former may take any desired form; for example, it may be in the form of a cylindrical body made of synthetic resin or elastic material such as metal and split at one circumferential location. However, the front end thereof is preferably split at two or more circumferential locations to allow the chuck to open and close (claim 4). This arrangement ensures easy and reliable opening and closing of the chuck 4 and also easy and reliable grip and release of the bar-like member 2.

The means for biasing the chuck 4 rearwardly of the clamp 5 and the means for biasing the pressing member 1 rearwardly of the clamp 5, described above, may be implemented by separate springs 9 and 6. With this arrangement, even when the pressing member 1 and the chuck 4 are separately formed, the pressing member 1 and the clamp 5 are biased to move away from each other when the present device is not used; therefore, there is no play between the pressing member 1 and the clamp 5 and the device as a whole is convenient to operate. Unlike the above, if the pressing member 101 and the chuck 4, 104 are integrally formed as a unit, the two means may be constituted by the same spring 9. That is, a single spring 9 may be interposed between the pressing member 101 and the clamp 105, 205, thus enabling the device to be made compact.

A storage chamber 1A, 101A for bar-like members may be formed in the rear of the pressing member 1, 101 and an insertion hole for the bar-like member 2 may be formed in a flange 1B, 101B disposed at the front end of the storage chamber 1A, 101A (claim 7). With this arrangement, a number of bar-like members 2 may be stored in the storage chamber 1A, 101A and each time the preceding bar-like member 2 is used, the next bar-like member 2 can be fed into the chuck 4, 104 through the insertion hole in the flange 1B, 101B. Therefore, a number of grafting operations can be continuously conducted by a single grafting device. In this case, if that surface of the flange 1B, 101B which is associated with the storage chamber 1A, 101A is a tapered surface leading to the insertion hole, then a bar-like member 2 in the storage chamber 1A, 101A at a higher level can be automatically fed into the chuck 4, 104 at lower level through the insertion hole as its lower end is guided by the tapered surface.

The grafting device of this invention has a jig 10 removably fitted on the front end thereof, so that in the state in which said clamp 5, 105, 205 has protruded forwardly relative to the pressing member 1, 101, the front end 5C, 105C, 205C of the clamp 5, 105, 205 has abutted against the jig 10, the latter being formed with an axial bottomed hole 10C aligned with said hole 5D, 105D, 205D in the clamp 5, 105, 205.

In the case where the grafting device is equipped with the jig 10 as described above, the device is used as follows.

Since the front end 5C, 105C, 205C of the clamp 5, 105, 205 abuts against the jig 10, pressing the pressing member 1, 101 in the direction of the jig 10 results in the pressing member 1, 101 advancing as attended by the chuck 4, 104, so that the chuck 4, 104 is opened to release the bar-like member 2 gripped thereby; thus, the front end of the bar-like member advances into the bottomed hole 10C in the jig 10 until it strikes the bottom, whereupon the bar-like member stops. In this manner, the protruding length of the bar-like member 2 is determined by the jig 10.

It is preferable that the jig 10 is in the form of a bottomed cylindrical body and that the front end 5C, 105C 205C of said clamp 5, 105, 205 is adapted to abut against the bottom surface 10B of the jig 10, the bottomed hole 10C being formed in the bottom of the jig 10.

With this arrangement, the jig 10 can be easily mounted on the grafting device by inserting the front end of the grafting device, i.e., its end associated with the clamp 5, 105, 205 into the jig 10. Further, with the jig 10 mounted in this manner, the front end hole 5D, 105D, 205D of the clamp 5, 105, 205 is automatically aligned with the bottomed hole 10C. Therefore, a front portion of predetermined length of the bar-like member 2 can be protruded outward by a so-called one-touch operation which advances the pressing member 1, 101 toward the jig 10 at a touch.

The means for opening and closing the chuck 4 in response to the advance and retraction of the chuck 4 may comprise a tapered surface 5B, 105B on the inner peripheral surface of the clamp 5, 105, the tapered surface being gradually increased in diameter toward the front end.

With this arrangement, when the chuck 4 is advanced toward the front end of the clamp 5, 105, it easily opens owing, for example, to the elasticity of its material. Further, when the chuck 4 is retracted relative to the clamp 5, 105 it is decreased in diameter by the tapered surface 5B, 105B until it is closed. At this time, the bar-like member 2 is gripped by the chuck 4, and there is no possibility of the bar-like member 2 being retracted into the grafting device.

Balls 7 may be disposed between the outer peripheral surface of the chuck 4 and the tapered surface 5B, 105B (claim 12). The balls 7 thus disposed cooperate with the tapered surface 5B, 105B of the clamp 5 to subject the chuck 4 to a stronger wedge action when the chuck 4 retracts, so that the chuck is closed to grip the bar-like member. If a force acts to retract the bar-like member 2 from this state, then the friction between the outer peripheral surface of the bar-like member 2 and the inner surface of the chuck 4 produces a force which acts to retract the chuck 4 also. At this time, the presence of the interposed balls 7 allows the chuck 4 to slightly retract with ease, whereby the chuck 4 is further tightened, never allowing the bar-like member 2 to retract. In contrast, in the state in which the chuck 4 grips the bar-like member 2 and a force acts to withdraw the bar-like member 2 toward the front end, the chuck readily slightly advances, thereby being somewhat opened, allowing the bar-like member 2 to advance. In other words, the bar-like member 2 is prevented from retracting into the chuck but is allowed to advance. That is, the bar-like member gripped by the chuck is allowed to come out of the grafting device but is prevented from retracting into the chuck.

The balls 7 may be disposed on a head recess 4A on the outer periphery of the chuck 104. With this arrangement, the balls 7 are reliably held on the head of the chuck 4 and the chuck 4 is reliably opened and closed by the tapered surface 5B, 105B through use of the balls 7.

The means for opening and closing the chuck 104 in response to the advance and retraction of the chuck 104 may comprise a tapered surface 104B which to formed on the outer peripheral surface of the chuck 104 and which is gradually increased in diameter toward the front end, and an inner step 205E formed on the inner peripheral surface of the clamp 205 and having an increased diameter at the front end thereof. In this case, when the chuck 104 is retracted, the tapered surface of the 104B chuck 104 is pressed by the inner step 205E of the clamp 205 with a wedge action produced therebetween which closes the chuck 104. Thereby, the bar-like member 2 is gripped by the chuck 104, never to advance or retract.

The grafting device of this invention may be constructed as follows.

A grafting device wherein a bar-like member 2 protruding out of a front end hole 5D, 105D is inserted into the stem of a stock at its graft joint end, comprises a chuck 4 having a half-split head and adapted for opening and closing, balls 7 disposed in a head recess 4A of each half of the chuck 4, a chuck spring 9 urging the chuck 4 lengthwise rearward, a clamp 5, 106 with a tapered surface 5B, 105B abutted by the balls 7, and a pressing member 1, 101 with a storage chamber 1A, 101A storing bar-like members 2, the arrangement being such that the chuck 4 is held closed by the wedge action between the balls 7 and the tapered surface 5B, 105B of the clamp 5, 105, holding a bar-like member 2 in such a manner as to allow advance but prevent retraction of the bar-like member 2, the front end 5C, 106C of the clamp 5, 105 abutting against a jig 10 formed with a hole 10C of suitable depth, and such that when the pressing member 1, 101 is depressed, the chuck 4 advances downward in operative connection with the pressing member 1, 101, with the balls 7 separating from the tapered surface 5B, 105B of the claim 5, 105 to open the chuck 4, allowing the bar-like member 2 to fall through the chuck 4 and the front end hole 5D, 105D of the clamp 5, 105 into the hole 10C of the jig 10, and then when the pressing force on the pressing member 1, 101 is removed, the chuck 4 is closed to hold the bar-like member 2, with a portion of predetermined length of the bar-like member 2 protruding out of the front end hole 5D, 105D of the clamp 5, 106.

The grafting method using this grafting device will now be described. The operator depresses the pressing member 1 to advance the latter, whereby the chuck 4 is advanced downward and opened. Thereby, a bar-like member 2 stored in the storage chamber 1A of the pressing member 1 passes through the chuck 4, falling with the front end first into the hole 10C of the jig 10. Thereafter, when the operator stops pressing the pressing member 1, the latter is retracted upward, closing the chuck 4 which then allows advance but prevents retraction of the bar-like member 2. Therefore, the front end of the bar-like member 2 protrudes through the front end hole 5D of the clamp 5. In this state, the operator thrusts the bar-like member 2 protruding through the front end hole 5D of the clamp 5 into the joint end of the stock, whereby the bar-like member 2, which is held by the chuck 4 in such a manner as to prevent its retraction, is inserted into the stem of the stock without retracting in the chuck 4. Then, when the pressing member 1 is taken away from the stock, the bar-like member 2 advances in the chuck 4 to leave the front end hole 5D of the clamp 5 without slipping off the stock since it is held by the chuck 4 while being allowed to advance. Then, holding the joint portion of the stock by hand, the operator thrusts the bar-like member 2 attached to the stock into the joint end of the scion, thus abutting the joint ends of the stock and scion against each other for grafting.

Further, the grafting device of this invention may be constructed as follows.

A grafting device wherein a bar-like member 2 protruding out of a front end hole 205D is inserted into the stem of a stock at its graft joint end, comprises a chuck 104 having a multi-split head and adapted for opening and closing, a chuck spring 9 urging the chuck 104 lengthwise rearward, a clamp 205 abutted by the head of the chuck 104, and a pressing member 101 with a storage chamber 101A storing bar-like members 2, the arrangement being such that the chuck 104 is held closed by the wedge action between the head of the chuck 104 and the clamp 205 to hold a bar-like member 2 with a suitable force, the front end 205C of the clamp 205 abutting against a jig 10 formed with a hole 10C of suitable depth, and such that when the pressing member 101 is depressed, the chuck 104 is opened to allow the bar-like member 2 to fall through the chuck 104 and the front end hole 205D of the clamp 205 into the hole 10C of the jig 10, and then when the pressing force on the pressing member 101 is removed, the chuck 104 is closed to hold the bar-like member 2, with a portion of predetermined length of the bar-like member 2 protruding out of the front end hole 205D of the clamp 205.

The grafting method using this grafting device will now be described. The operator depresses the pressing member 101 to advance the latter, whereby the chuck 104 is advanced downward and opened. Thereby, a bar-like member 2 stored in the storage chamber 101A of the pressing member 101 passes through the chuck 104 until its front end is inserted into the hole 10C of the jig 10. Thereafter, when the operator stops pressing the pressing member 101, the latter retracts upward, closing the chuck 104 which then holds the bar-like member 2. Therefore, the front end of the bar-like member 2 protrudes through the front end hole 205D of the clamp 205. In this state, the operator thrusts the bar-like member 2 protruding out of the front end hole 205D of the clamp 205 into the joint end of the stock, whereby the bar-like member 2, which is held by the chuck 104, is inserted into the stem of the stock without retracting in the chuck 104. Then, the operator advances the pressing member 101 relative to the clamp 205 to open the chuck 104 again, whereupon the bar-like member 2 is released from the grafting device. Thereafter, holding the joint portion of the stock by hand, the operator thrusts the bar-like member 2 into the joint end of the scion, thus abutting the joint ends of the stock and scion against each other for grafting.

The storage chamber 1A, 101A has bar-like members 2 stored therein, and as such bar-like member 2, use may be made of one having a first bar-like portion to be inserted into the stem of the stock at its graft joint end and a second bar-like portion axially continuous with the first bar-like portion and adapted to be inserted into the stem of said scion at its graft joint end. In this case, the first bar-like portion is caused to protrude from the grafting device and is inserted into the stem of a stock at its graft joint end, while the second bar-like portion is caused to protrude from the graft joint end of the stock and is thrusted into the stem of a scion at its graft joint end.

It is preferable that the front ends of the first and second bar-like portions of the bar-like member are sharp-pointed, thereby facilitating the insertion of the front ends into the stems of a stock and a scion.

The connecting portion between the first and second bar-like portions of the bar-like member may be formed with a deformed portion which defines an insertion boundary. If the bar-like member 2 is inserted into the stock as far as the deformed portion, then the amount of insertion of the bar-like member 2 is always constant.

It is preferable that the outer surface of the bar-like member is roughened. With this arrangement, the fixing property of the bar-like member 1 after the latter has been inserted into the stock and scion is improved.

The bar-like member is preferably made of a material which does not impede the growth of graft-processed plants. In concrete, it may be made of at least one member selected from the group consisting of a vegetable rigid fiber, a chitin or chitosan fiber, a synthetic resin, a metallic material, a carbonaceous material, a ceramic material, vitreous material and a composite material thereof.

It is preferable that the bar-like member contains a chemical, wherein upon completion of grafting process, the chemical exudes to permeate into the stock and scion.

The bar-like member may be made of a porous material. If the bar-like member is porous, then this increases the adhesion between the surface of the bar-like member and the cormophyte structure (cells), increasing the rooting rate between the joint portions of a stock and a scion.

The chemical may be at least one member selected from the group consisting of a water soluble synthetic paste, a plant growth promoting agent and an antimicrobial agent.

PREFERRED EMBODIMENTS OF THE INVENTION

Figure 1:
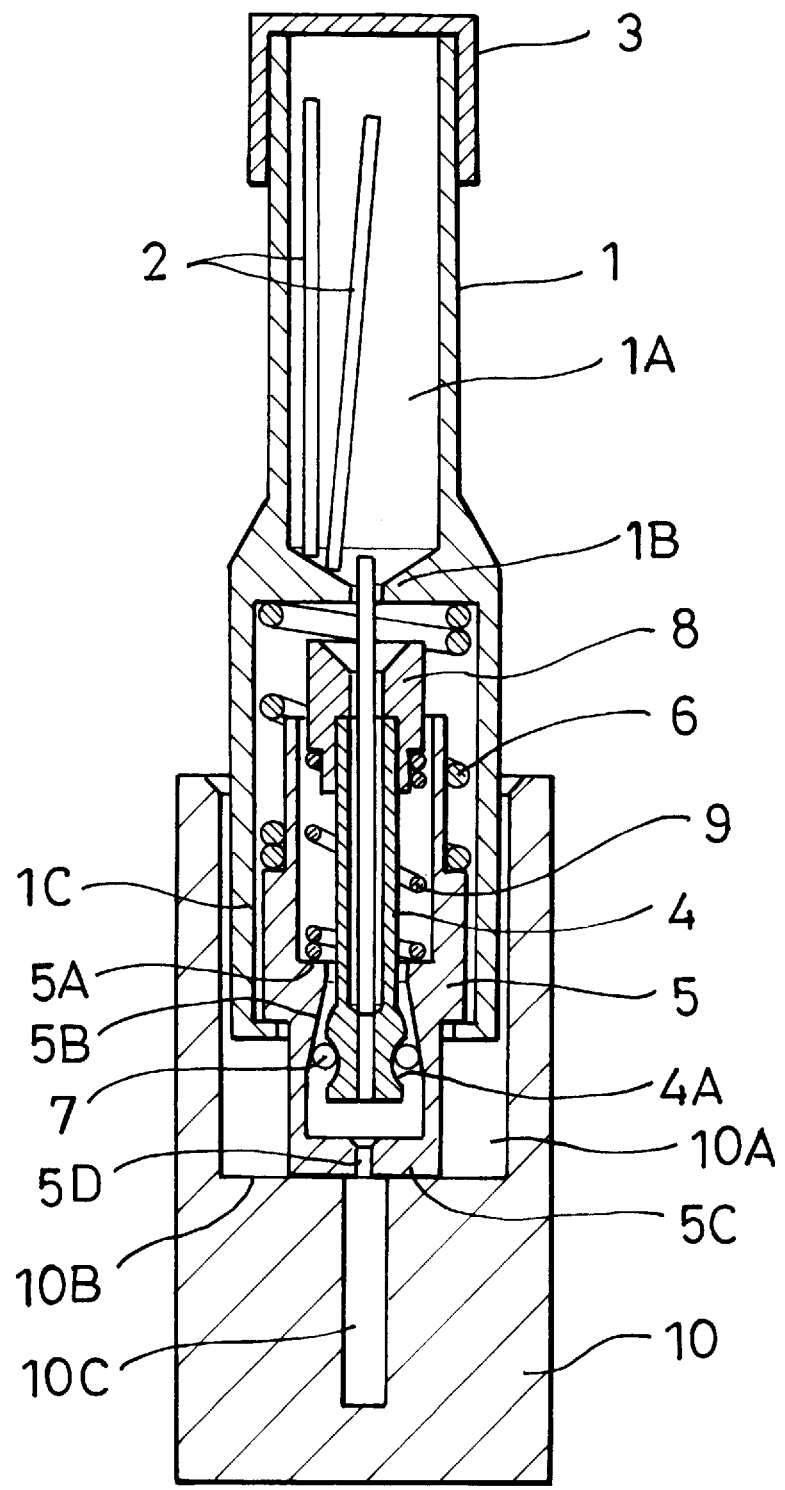
FIG. 1 is a longitudinal sectional view showing an embodiment of a grafting device according to the present invention.
Figure 2:
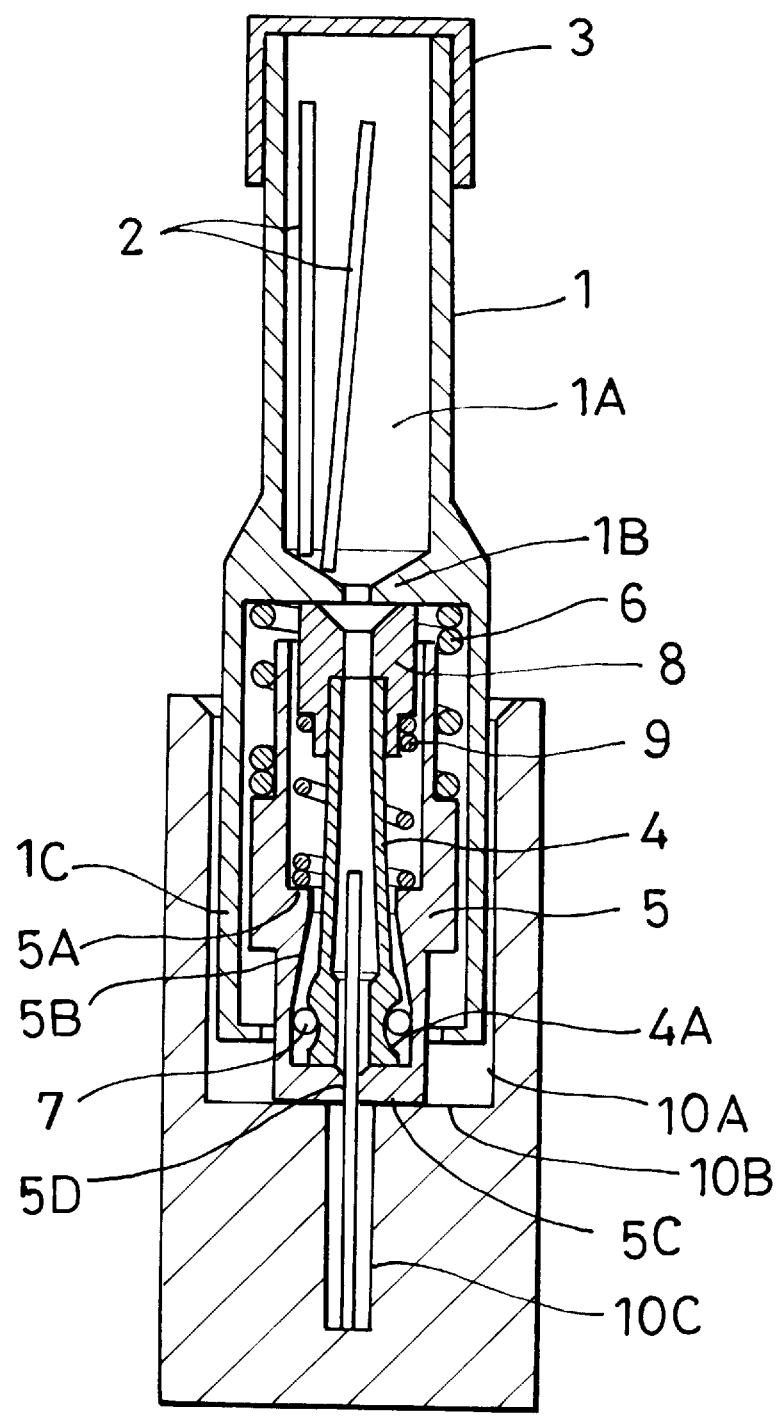
FIG. 2 is a longitudinal sectional view showing the chuck of FIG. 1 in its opened state.
Figure 3:
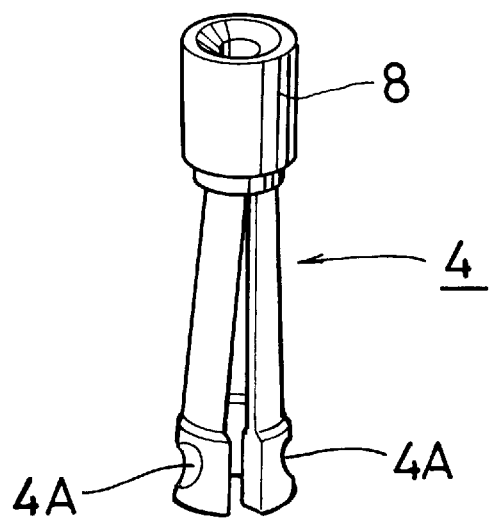
FIG. 3 is an enlarged perspective view of the chuck of FIG. 1.

FIGS. 1 through 3 show an embodiment of a grafting device according to the present invention, comprising a pressing member 1, a clamp 5 and a chuck 4. The pressing member 1 is in the form of a cylindrical body, opened at its opposite ends, having a storage chamber 1A formed at its rear portion, in which a plurality of bar-like members 2 are stored. The rear opening in the pressing member 1 is closed by a removable cover 3. The front portion of the storage chamber 1A is formed with a funnel-shaped flange 1B, so that the bar-like members 2 are led one by one through a hole in the flange 1B into the chuck 4 to be described in more detail. A cylindrical clamp 5 closed at its front end and open at its rear end is slidably housed in the front portion of the pressing member 1. Normally, the clamp 5 is forwardly biased by a return spring 6 installed between a step on an outer periphery of the clamp 5 and the flange 1B of the pressing member 1. The chuck 4, which is split in half at its front portion to enable the chuck to be opened and closed, is housed in the clamp 5, and balls 7 are installed in the head recess 4A of each of the halves of the chuck. A chuck spring 9, which is relatively low in spring force, is installed between the inner step 5A of the clamp 5 and a holder 8 fixed to the rear portion of the chuck 4, so that the chuck 4 is lengthwise rearwardly biased by the chuck spring 9. Therefore, the balls 7, disposed on the head of the chuck 4, are pressed against the tapered surface 5B of the clamp 5, producing a wedge action which closes the chuck 4. A step on a front outer periphery of the clamp 5 abuts against an inward flange formed on the front end of the pressing member 1, with a front end 5C of the clamp 5 suitably protruding out of the pressing member 1. The front end 5C of the clamp 5 is formed with a front end hole 5D passable by the bar-like member 2. Further, the numeral 10 denotes a cylindrical bottomed jig fitted on the front portion of the pressing member 1. A bore 10A of the jig 10 is formed with a hole 10C of suitable depth as measured from a bottom surface 10B of the bore 10A, and a front end 1C of the pressing member 1 is inserted in the bore 10A of the jig 10, while the front end 5C of the clamp 5 abuts against the bottom surface 10B. At this time, the front end hole 5D and the hole 10C are aligned with each other.

Figure 4:
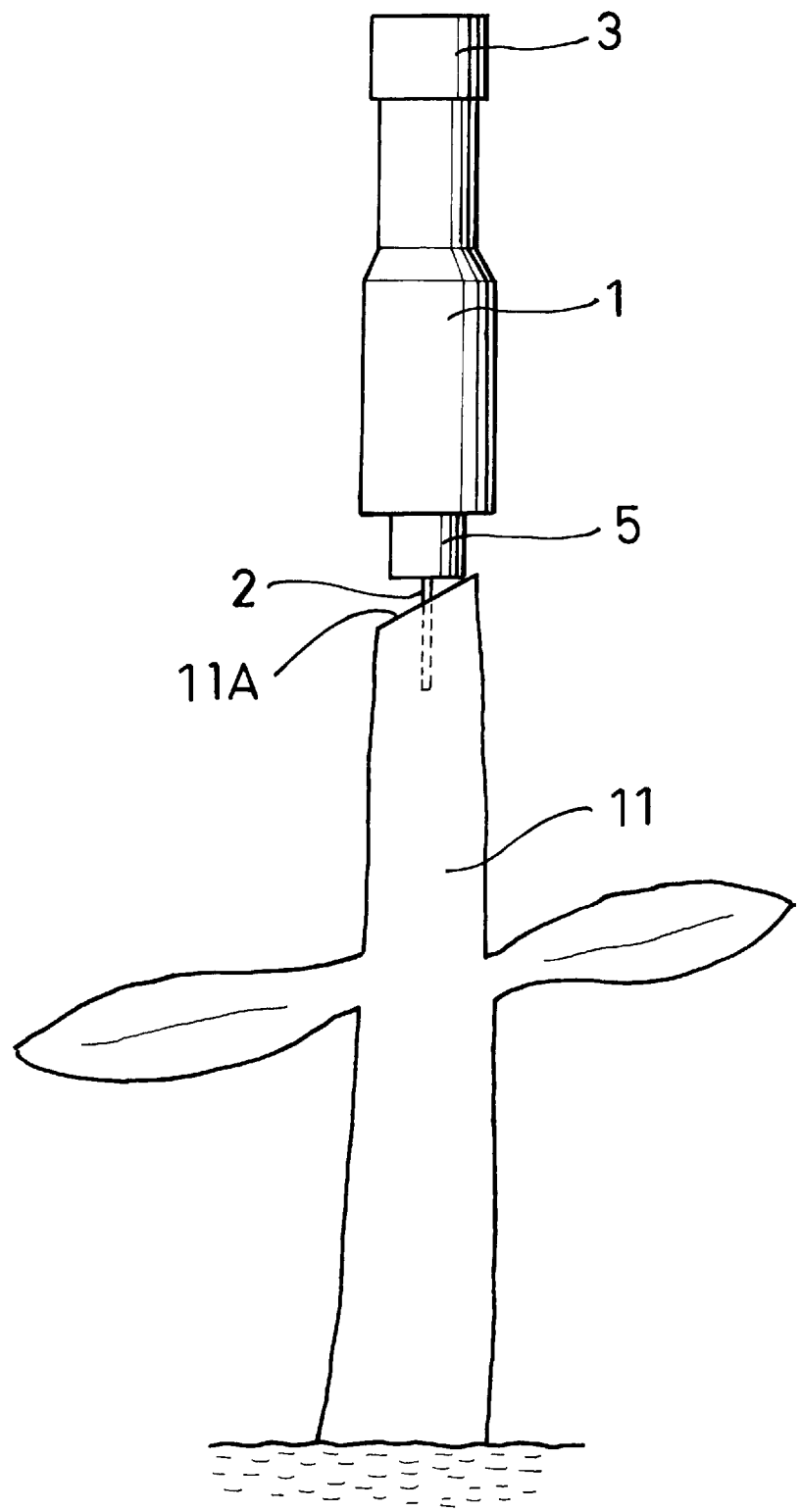
FIG. 4 is a front view showing a bar-like member inserted into the stem of a stock at its joint end by utilizing the grafting device of FIG. 1.
Figure 5:
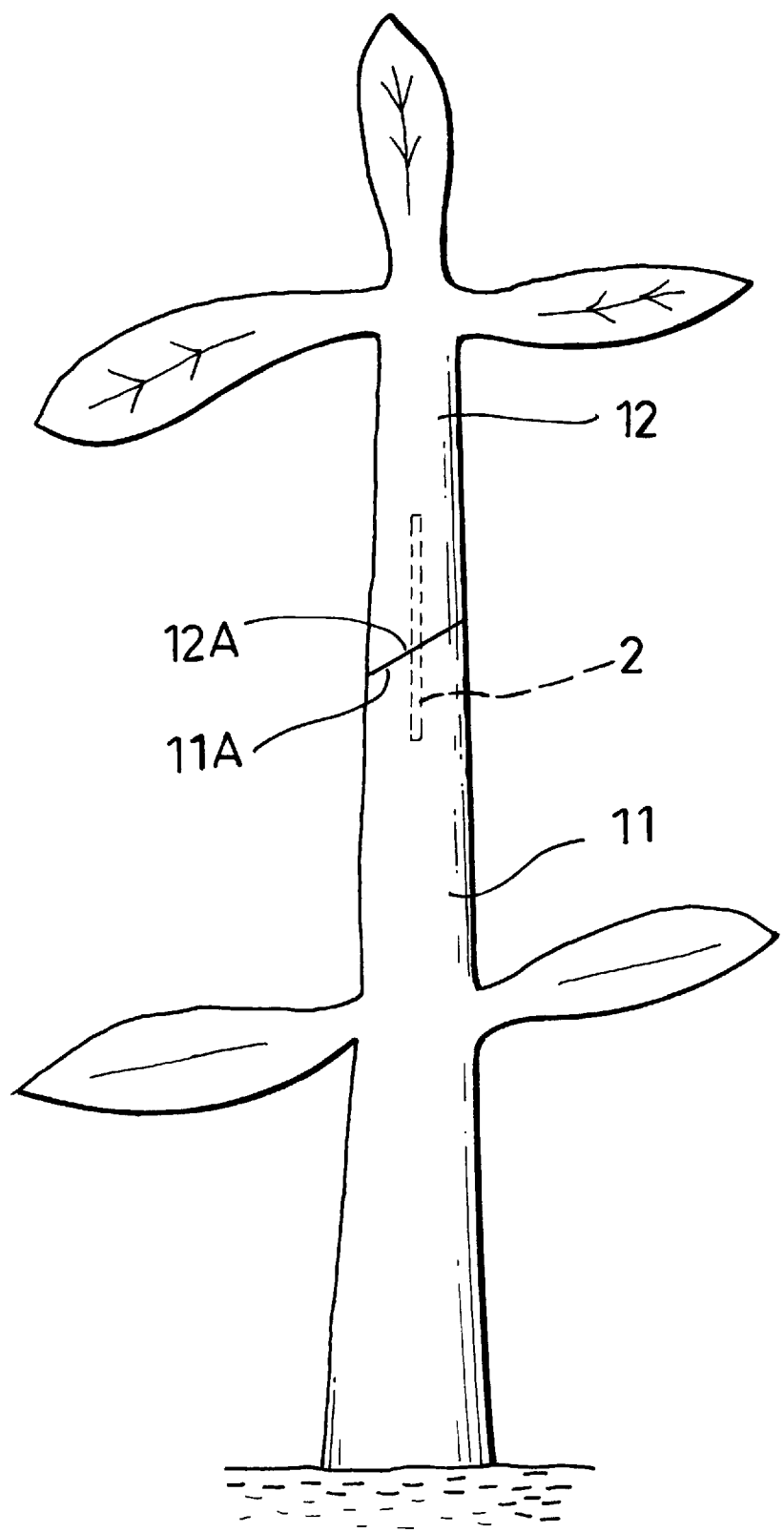
FIG. 5 is a front view showing a scion being grafted on a stock by means of a bar-like member according to the invention.

The grafting method using the grafting device described with reference to FIGS. 1 through 3 will now be described. In the state of FIG. 1, the operator depresses the pressing member 1 to advance the latter, whereby the flange 1B of the pressing member 1 presses the holder 8, advancing the chuck 4 downwardly to open the latter. Thereupon, one of the bar-like members 2 stored in the storage chamber 1A of the pressing member 1 passes through the hole of the flange 1B and through the chuck 4, falling front end first into the hole 10C of the jig 10 to assume the state shown in FIG. 2. Thereafter, when the operator stops pressing the pressing member 1, the latter is retracted upward to close the chuck 4 which then holds the bar-like member 2 in such a manner as to allow advance but prevent retraction of the bar-like member 2. Therefore, the bar-like member 2 protrudes by about half its length out of the front end hole 5D of the clamp 5. In this state, the operator thrusts the bar-like member 2 protruding out of the front end hole 5D of the clamp 5 into the joint end 11A of a stock 11 as shown in FIG. 4, whereby the bar-like member 2, which is held by the chuck 4 such that its retraction is prevented, is inserted into the stem of the stock 11 without being retracted in the chuck 4; thus, the state shown in FIG. 4 is established. Then, the operator disengages the pressing member 1 from the stock 11, whereupon, the bar-like member 2, which is held by the chuck 4 such that its advance to allowed, advances in the chuck 4 until it leaves the front end hole 5D of the clamp 5 without slipping off the stock 11. Then, holding the joint portion of the stock 11 by hand, the operator thrusts the bar-like member 2 attached to the stock 11 into the joint end 12A of the scion 12, thus abutting the graft joint ends 11A and 12A of the stock 11 and scion 12 against each other for grafting, as shown in FIG. 5.

Therefore, in this embodiment, due to the fact that the holding of the bar-like member 2 by the chuck 4 allows advance but prevents retraction of the bar-like member 2, the bar-like member 2 can be inserted by about half its length into the stock 11 by the simple operation of inserting the bar-like member 2 protruding from the grafting device into the stock 11 and then separating the grafting device from the stock 11.

As described above, in this embodiment, the arrangement in which the chuck 4 is closed to hold the bar-like member 2, advance of the bar-like member 2 is allowed but its retraction is prevented by the following mechanism.

When a force acts to retract the bar-like member 2 into the chuck 4 from the state of being gripped by the chuck 4, the friction between the outer peripheral surface of the bar-like member 2 and the inner peripheral surface of the head of the chuck 4 produces a force which acts to retract the chuck 4 relative to the clamp 5. At this time, the presence of the interposed balls 7 allows the chuck 4 to retract slightly relative to the clamp 5 with ease. Thereby, the chuck 4 is closed tighter, never allowing any further advance. In contrast, with the chuck 4 gripping the bar-like member 2, if a force acts to withdraw the bar-like member 2 toward the front end, the friction between the outer peripheral surface of the bar-like member 2 and the inner peripheral surface of the head of the chuck 4 produces a force which acts to advance the bar-like member 2 relative to the clamp 5. At this time, the presence of the interposed balls 7 allows the chuck 4 to advance slightly relative to the clamp 5 with ease. Thereby, the chuck 4 is slightly opened, allowing the bar-like member 2 to advance.

In addition, when the chuck 4 is not clamped by the clamp 5, it is urged such that the head is opened by its own elasticity.

Figure 6:
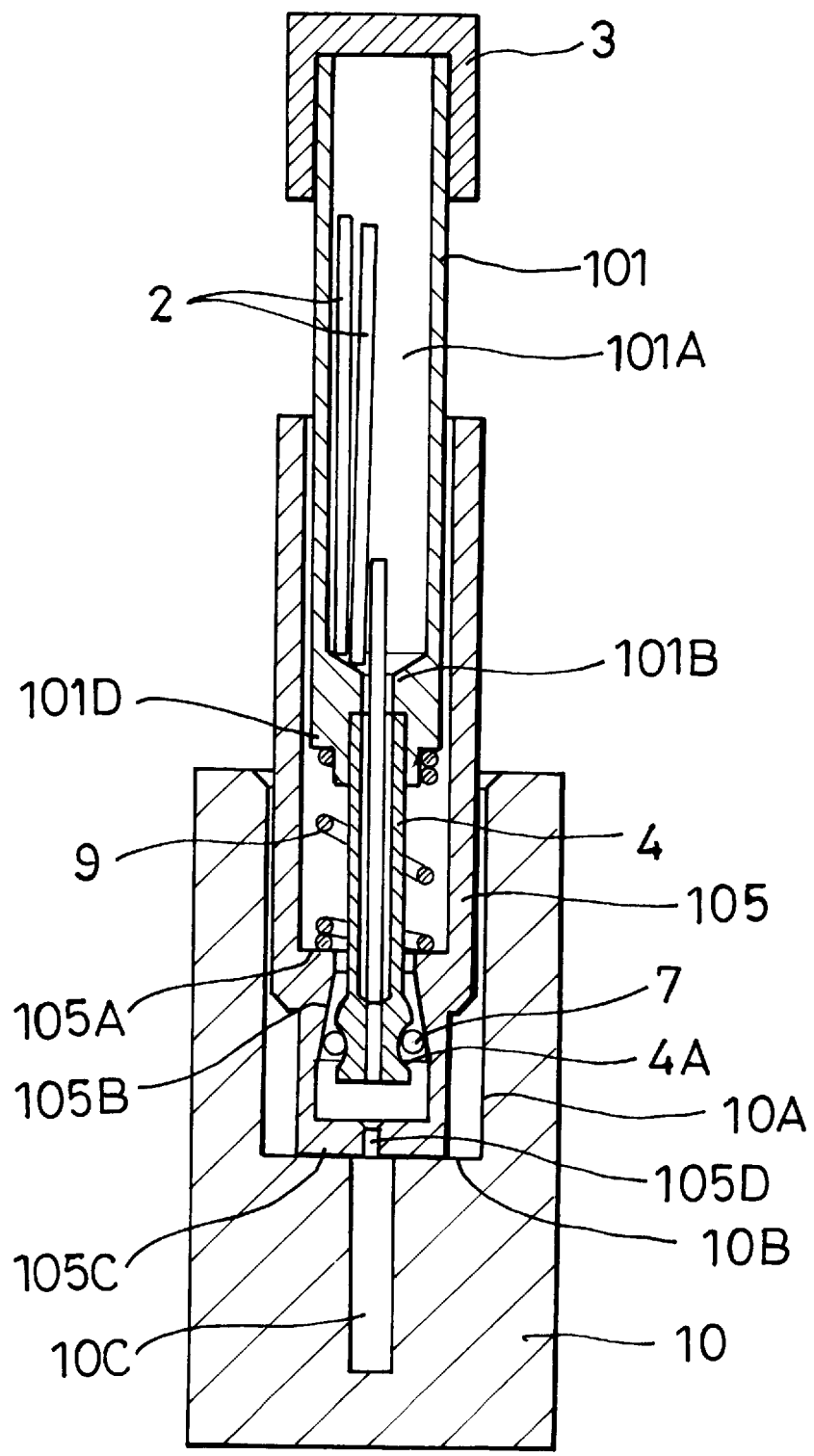
FIG. 6 is a longitudinal sectional view showing another embodiment of a grafting device according to the present invention.

FIG. 6 shows another embodiment of a grafting device according to the present invention. The same members as those used in the embodiment of FIG. 1 are denoted by the same reference characters, while members which differ in construction are denoted by the corresponding reference characters used in FIG. 1 but with 100 added thereto. What differs from the embodiment shown in FIG. 1 is as follows.

A pressing member 101 is smaller in diameter and inserted in a clamp 105. The rear end of the chuck 4 is fixed to a flange 101B of a pressing member 101, and an chuck spring 9 is installed between the inner step 105A of an clamp 105 and the outer step 101D of the pressing member 101, and the chuck spring 9 biases the chuck 4 and pressing member 101 lengthwise rearward. Further, the pressing member 101 does not extend forwardly of a flange 101B.

In the embodiment shown in FIG. 6, as in the case of the embodiment shown in FIGS. 1 through 3, depressing the pressing member 101 causes the bar-like member 2 to suitably protrude out of the front end hole 105C of the clamp 105; thus, it is possible to insert the bar-like member 2 into the stem of a stock at its joint end by performing the same operation as in the embodiment of FIG. 1.

In this embodiment also, with the chuck 4 closed to hold the bar-like member 2, advance of the bar-like member 2 is allowed but its retraction is prevented.

Figure 7:
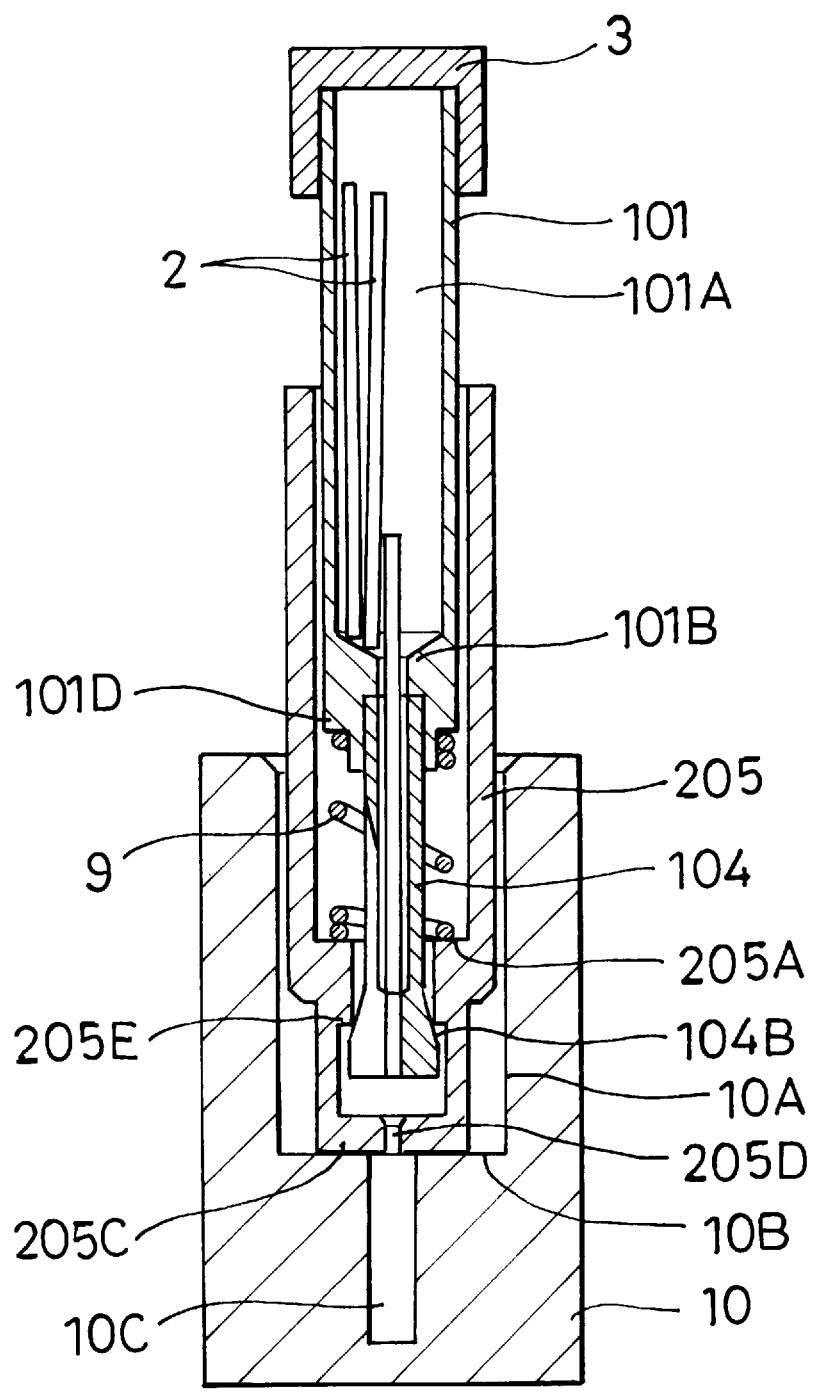
FIG. 7 is a longitudinal sectional view showing yet another embodiment of a grafting device according to the present invention.
Figure 8:
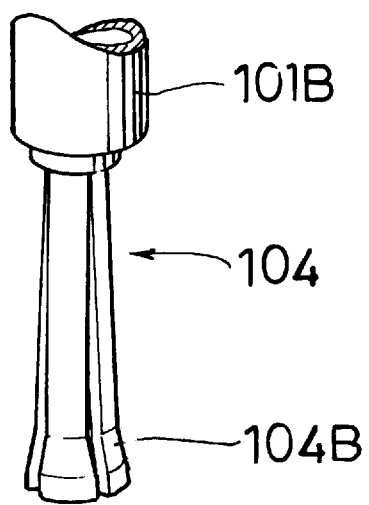
FIG. 8 is an enlarged perspective view of the chuck of FIG. 7.

FIGS. 7 and 8 show another embodiment of a grafting device according to the present invention. The same members as those used in the embodiments of FIGS. 1 through 3 and FIG. 6 are denoted by the same reference characters, while members which differ in construction from those used in the embodiments of these figures are denoted by the corresponding reference characters used in the above figures but with 100 added thereto. In this embodiment, as in the case of FIG. 6, the pressing member 101 is inserted in a clamp 205 and a chuck 104 is fixed to the pressing member 101, with the chuck spring 9 installed between an inner step 205A on the clamp 205 and the outer step 101D on the pressing member 101. However, unlike the case of FIGS. 1 through 3 and FIG. 6, the chuck 104 is split into three. Further, a tapered surface 104B formed on the head of the chuck 104 is pressed against a front inner step 205E on the clamp 205, and the wedge action between the tapered surface 104B of the chuck 104 and the front inner step 205E on the clamp 205 closes the chuck 104. Thereby, the bar-like member 2 is held by the chuck 104, and its advance and retraction are prevented.

The reason why the bar-like member 2 held by the chuck 4 is prevented not only from retracting but also from advancing is that because of the absence of balls 7, such as used in the first embodiment, even if the bar-like member 2 is caused to advance relative to the chuck 104, the chuck 104 never advances with ease relative to the clamp 205 and hence the chuck 104 will not open.

In using the grafting device shown in FIGS. 7 and 8, the operator thrusts the bar-like member 2 protruding out of the front end hole 205D of the clamp 205 into the joint end of a stock, whereby the bar-like member 2 is inserted into the stem of the stock without retracting in the chuck 104. Subsequently, the operator advances the pressing member 101 relative to the clamp 205 to open the chuck 104 again and release the bar-like member 2 from the grafting device. Thereafter, holding the joint end of the stock by hand, the operator thrusts the bar-like member 2 into the graft joint end of a scion, thus abutting the graft joint ends of the stock and scion against each other.

Though omitted from the illustration, as the bar-like member 2, use may be made of one having a first bar-like portion to be inserted into the stem of a stock and a second bar-like portion to be inserted into the stem of a scion. If the front ends of the first and second bar-like portions are sharp-pointed, this facilitates the insertion of the front ends into the stems of a stock and a scion. The boundary between the two may be formed with a deformed portion which defines an insertion boundary; thus, if the bar-like member is inserted into the stock as far as the deformed portion, then the amount of insertion of the bar-like member is always constant. Such deformed portion may be constructed by locally thickening, twisting or flattening the bar-like member. Further, if the outer surface of the bar-like member is roughened, the fixing property of the bar-like member after the latter has been inserted into the stock and scion is improved.

Further, the bar-like member is preferably made of a material which does not impede the growth of graft-processed plants. For example, It may be made of at least one member selected from the group consisting of a vegetable rigid fiber, a chitin or chitosan fiber, a synthetic resin, a metallic material, a carbonaceous material, a ceramic material, a vitreous material and a composite material thereof. According to circumstances, use may be made of leads for a mechanical pencil.

The bar-like member may contain a chemical, such as a water soluble synthetic paste, a plant growth promoting agent and an antimicrobial agent. Upon completion of grafting process, the contained chemical exudes to permeate into the stock and scion.

If the bar-like member is made of a porous material, then this increases the adhesion between the surface of the bar-like member and the cormophyte structure, increasing the rooting rate between the joint portions of a stock and a scion.

In addition, the bar-like member is not limited in cross-sectional shape to circular; it may be hexagonal, quadrangular or triangular. Further, the diameter of the bar-like member may be optionally determined in accordance with the stem diameter of a stock, but usually, it is from 0.3 mm to 1.0 mm or thereabouts, and its overall length is preferably 15 mm.

What is claimed is:

1. A grafting device for inserting a bar member into a stem of a stock, comprising:
   a chuck for holding the bar member;
   a tubular clamp having a hole in a front end thereof for the bar member to pass therethrough;
   said tubular clamp having said chuck disposed therein in alignment with said hole in said front end of said tubular clamp such that said bar member may pass through said chuck and through said hole, said chuck being axially movable within said tubular clamp;
   a tubular pressing member disposed axially movable relative to said tubular clamp for effecting axial movement of said chuck relative to said tubular clamp;
   chuck biasing means for biasing said chuck rearwardly away from said front end of said tubular clamp; and
   means for opening and closing said chuck in response to said axial movement of said chuck relative to said tubular clamp.

2. A grafting device as set forth in claim 1, further comprising pressing member biasing means for biasing said tubular pressing member apart from said tubular clamp in a rearward direction away from said front end of said tubular clamp.

3. A grafting device as set forth in claim 2, wherein said chuck biasing means and said pressing member biasing means are respectively first and second springs.

4. A grafting device as set forth in claim 2, wherein said chuck biasing means and said pressing member biasing means are a common spring and said chuck is engaged with said tubular pressing member.

5. A grafting device as set forth in claim 1, wherein a front end of said chuck is split at at least two circumferential locations to allow said chuck to open and close.

6. A grafting device as set forth in claim 1, wherein:
   said tubular pressing member has a storage chamber for storing bar members formed in a rear end of said tubular pressing member;
   said tubular pressing member has an interior flange disposed at a front end of said storage chamber; and
   said interior flange defines an insertion hole for passing one of said bar members into said chuck.

7. A grafting device as set forth in claim 6, wherein a surface of said interior flange forming a front end of said storage chamber is tapered leading to said insertion hole to guide ones of said bar members into said insertion hole.

8. A grafting device as set forth in claim 1, further comprising:
   a jig member having an engaging means for removably accepting said front end of said tubular clamp and a bar member receiving hole formed in alignment with said hole in said front end of said tubular clamp such that said bar member may pass through said hole in said front end of said tubular clamp and into said bar member receiving hole when said tubular clamp is engaged with said jig member; and said bar member receiving hole having a bottom and a predetermined depth.

9. A grafting device as set forth in claim 8, wherein said engaging means of said jig member is a bottomed circular recess for accepting said front end of said tubular clamp such that said front end of said tubular clamp is abutable against a bottom surface of said bottomed circular recess.

10. A grafting device as set forth in claim 1, wherein said means for opening and closing said chuck comprises said tubular clamp having a tapered inner peripheral surface for compressing said chuck, said tapered inner peripheral surface increasing in diameter toward said front end of said tubular clamp.

11. A grafting device as set forth in claim 10, wherein balls are disposed between an outer peripheral surface of said chuck and said tapered inner peripheral surface.

12. A grafting device as set forth in claim 11, wherein said outer peripheral surface of said chuck has a recess for accepting said balls.

13. A grafting device as set forth in claim 1, wherein said means for opening and closing said chuck comprises a tapered surface formed on an outer peripheral surface of said chuck which gradually increases in diameter toward a front end of said chuck, and said tubular clamp having an inner step formed on an inner peripheral surface of said tubular clamp and increasing in diameter toward said front end of said tubular clamp.

14. A grafting device for inserting a bar member into a stem of a stock, comprising:

a chuck having a half-split head for opening and closing on said bar member;

said chuck having head recesses in each half of said half-split head with balls disposed therein;

a clamp member having said chuck movably disposed axially therein, said clamp member having an inner tapered surface abutted by said balls;

a chuck spring biasing said chuck in said clamp member in a rearward direction to bring said balls into abutting engagement with said inner tapered surface of said clamp member to effect compression of said chuck by said inner tapered surface to hold said bar member in said chuck such that said bar member is released by said chuck when pulled in a forward direction out of said chuck and such that said bar member is secured in a clamped position in said chuck when pressure is applied to said bar member in a rearward direction into said chuck due to compression of said chuck;

a pressing member with a storage chamber for storing bar members, said pressing member being disposed axially movable relative to said clamp member for effecting relative axial movement of said chuck and said clamp member;

a jig member having an engaging means for removably accepting a front end of said clamp member and a bar member receiving hole formed in alignment with a hole in a front end of said clamp member such that said bar member may pass through said hole in said front end of said clamp member and into said bar member receiving hole when said clamp member is engaged with said jig member; and said bar member receiving hole having a bottom and a predetermined depth such that when said clamp member is engaged with said jig member and said pressing member is depressed by an operator applied force, said chuck advances forward in a downward direction in response to engagement with said pressing member and said balls disengage from said inner tapered surface of said clamp member to open said chuck and allow said bar member to fall through said chuck and said hole in said front end of said clamp member and into said bar member receiving hole of said jig member, such that when the operator applied force on said pressing member is removed, said chuck is closed by action of said chuck spring to clamp said bar member with a portion of said bar member having a predetermined length protruding out of said hole in said front end of said clamp member.

15. A grafting device for inserting a bar member into a stem of a stock at a graft joint end thereof, comprising:

a chuck having a multi-split head opening and closing on said bar member;

a clamp member having said chuck movably disposed axially therein, the clamp member having an inner tapered surface abutted by said multi-split head of said chuck;

a chuck spring biasing said chuck in said clamp member in a rearward direction to bring said multi-split head into abutting engagement with said inner tapered surface of said clamp member to effect compression of said chuck by said inner tapered surface to hold said bar member in said chuck and such that said bar member is secured in a clamped position in said chuck when pressure is applied to said bar member in a rearward direction into said chuck due to compression of said chuck;

a pressing member for pressing said chuck against a biasing force of said chuck spring, said pressing member having a storage chamber for storing bar members;

a jig member having an engaging means for removably accepting a front end of said clamp member and a bar member receiving hole formed in alignment with a hole in a front end of said clamp member such that said bar member may pass through said hole in said front end of said clamp member and into said bar member receiving hole when said clamp member is engaged with said jig member; and said bar member receiving hole having a bottom and a predetermined depth such that when said clamp member is engaged with said jig member and said pressing member is depressed by an operator applied force, said chuck is advanced forward relative to said clamp member and in a downward direction displacing said inner tapered surface from said multi-split head to open said chuck to allow said bar member to fall through said chuck and said hole in said front end of said clamp member and into said bar receiving hole of said jig member, such that when the operator applied force on said pressing member is removed, said chuck is closed by action of said chuck spring to hold said bar member with a portion of a predetermined length protruding out of said hole in said front end of said clamp member.

16. A grafting device for grafting a stem of a stock to a stem of a scion, comprising:

a storage chamber having bar members stored therein and at least a bar member of said bar members having a first bar portion to be inserted into the stem of said stock at a graft joint end and a second bar portion, axially continuous with said first bar portion, and adapted to be inserted into the stem of said scion at its graft joint end;

a chuck having a multi-split head opening and closing on said bar member;

a clamp member having said chuck movably disposed axially therein, the clamp member having an inner tapered surface abutted by said multi-split head of said chuck;

a chuck spring biasing said chuck in said clamp member in a rearward direction to bring said multi-split head into abutting engagement with said inner tapered surface of said clamp member to effect compression of said chuck by said inner tapered surface to hold said bar member in said chuck and such that said bar member is secured in a clamped position in said chuck when pressure is applied to said bar member in a rearward direction into said chuck due to compression of said chuck;

a pressing member for pressing said chuck against a biasing force of said chuck spring, said pressing member having said storage chamber incorporated therein;

a jig member having an engaging means for removably accepting a front end of said clamp member and a bar member receiving hole formed in alignment with a hole in a front end of said clamp member such that said bar member may pass through said hole in said front end of said clamp member and into said bar member receiving hole when said clamp member is engaged with said jig member; and said bar member receiving hole having a bottom and a predetermined depth such that when said clamp member is engaged with said jig member and said pressing member is depressed by an operator applied force, said chuck is advanced forward relative to said clamp member and in a downward direction displacing said inner tapered surface from said multi-split head to open said chuck to allow said bar member to fall through said chuck and said hole in said front end of said clamp member and into said bar receiving hole of said jig member, such that when the operator applied force on said pressing member is removed, said chuck is closed by action of said chuck spring to hold said bar member with a portion of a predetermined length protruding out of said hole in said front end of said clamp member.

17. A grafting device as set forth in claim 16, wherein front ends of said first and second bar portions of said bar member are sharp-pointed.

18. A grafting device as set forth in claim 16, wherein a connecting portion between said first and second bar portions of said bar member are formed by a deformed portion which defines an insertion boundary.

19. A grafting device as set forth in claim 16, wherein an outer surface of said bar member is roughened.

20. A grafting device as set forth in claim 16, wherein said bar member is made of a material which does not impede growth of graft-processed plants.

21. A grafting device as set forth in claim 16, wherein said bar member is made of at least one member selected from the group consisting of a vegetable rigid fiber, a chitin or chitosan fiber, a synthetic resin, a metallic material, a carbonaceous material, a ceramic material, a vitreous material and a composite material thereof.

22. A grafting device as set forth in claim 16, wherein said bar member contains a chemical.

23. A grafting device as set forth in claim 22, wherein said chemical is at least one member selected from the group consisting of a water soluble synthetic paste, a plant growth promoting agent and an antimicrobial agent.

24. A grafting device as set forth in claim 16, wherein said bar member is made of a porous material.

* * * * *